US005612713A

United States Patent [19]

Bhuva et al.

[11] Patent Number: 5,612,713

[45] Date of Patent: Mar. 18, 1997

[54] DIGITAL MICRO-MIRROR DEVICE WITH BLOCK DATA LOADING

[75] Inventors: Rohit L. Bhuva, Plano; James L. Conner, Rowlett; Michael J. Overlauer, Plano; William R. Townson, Coppell, all of Tex.

[73] Assignee: Texas Instruments Incorporated, Dallas, Tex.

[21] Appl. No.: 369,247

[22] Filed: Jan. 6, 1995

[51] Int. Cl.[6] .......... H04N 3/02

[52] U.S. Cl. .......... 345/84; 345/103; 345/85

[58] Field of Search .......... 345/84, 85, 103, 345/94–100; 348/740, 790, 792; H04N 3/10, 3/12, 3/14, 3/02, 3/06

[56] References Cited

U.S. PATENT DOCUMENTS

| | | | |
|---|---|---|---|
| 4,748,510 | 5/1988 | Umezawa | 348/792 |
| 5,278,652 | 1/1994 | Urbanus et al. | 358/160 |
| 5,307,056 | 4/1994 | Urbanus | 340/189 |

*Primary Examiner*—David E. Harvey
*Attorney, Agent, or Firm*—Robert C. Klinger; James C. Kesterson; Richard L. Donaldson

[57] ABSTRACT

A digital micro-mirror device (20) for imaging applications, having an array (21) of mirror elements for forming the image and data loading circuitry (22, 23, 24) for loading data for addressing the mirror elements. The data loading circuitry (22, 23, 24) has a row of shift registers (24), which receive one row of data at a time, which they deliver to latches (23). The latches (23) hold the data on bit-lines, which run down columns of the array (21). The row to be loaded is selected with a row decoder (25). A block load circuit (22), comprised of a shift register (35) and logic gates (33) divides each row of memory cells into blocks (31) and ensures that each block of a row of memory cells is sequentially loaded.

16 Claims, 2 Drawing Sheets

DIGITAL MICRO-MIRROR DEVICE WITH BLOCK DATA LOADING

TECHNICAL FIELD OF THE INVENTION

This invention relates to micro-mechanical devices, and more particularly to data loading circuitry for loading data to a digital micro-mirror device.

BACKGROUND OF THE INVENTION

A digital micro-mirror device (DMD), sometimes referred to as a deformable micro-mirror device, is a micro-mechanical device manufactured using integrated circuit techniques. It may be used to form images, and has been used in both display and printing applications.

DMDs used for imaging applications such as display or printing, have an array of hundreds or thousands of tiny tilting mirrors. Light incident on the DMD is selectively reflected or not reflected from each mirror to an image plane. Each mirror is attached to one or more hinges mounted on support posts, and spaced by means of an air gap over underlying address circuitry. The address circuitry includes a memory cell associated with each mirror. Each memory cell stores a 1-bit data value, which determines the state of an applied electrostatic force applied to the mirror. This electrostatic force is what causes each mirror to selectively tilt.

For imaging applications, the DMD memory cells must be loaded with large volumes of data at fast data rates. For this purpose, DMD devices have special data loading circuitry, which permits an entire row of data to be received into a row of shift registers, and then passed down bit-lines of the mirror array, with the proper row being selected with a row decoder. As data input bandwidth demands increase, there is a corresponding need for faster and more efficient loading methods.

SUMMARY

One aspect of the invention is a spatial light modulator (SLM), with improved data loading circuitry. The SLM has an array of pixel-generating elements, which are each individually addressable with an electrical signal corresponding to the state of a bit of input data. The array of pixel-generating elements includes an array of memory cells, one associated with each pixel-generating element. The memory cells receive data on bit-lines that run down each column of the memory cell array.

To load data into the SLM, a row of shift registers receives 1-bit data values for one row of memory cells. The shift registers deliver this row data to latches, which hold the data on the bit-lines. A block control circuit is interposed between the latches and the memory cells. This block control circuit sequences the delivery of the row data to the memory cells by logically dividing each row of memory cells into blocks, and sequentially delivering a block load signal to different blocks of the memory cells.

An advantage of the invention is that the loading of data to a row of memory cells is sequenced in time. This avoids high current transients that would otherwise result from loading an entire row of memory cells at one time. This increases the noise immunity of the SLM, and because the power bus need not be so wide, the area requirement for the die layout is smaller.

DETAILED DESCRIPTION OF THE INVENTION

The following description is in terms of a DMD-type spatial light modulator (SLM), which has a memory cell associated with each mirror element of an array. As explained below, the memory cells are loaded on a row-by-row basis, using a row of shift registers that delivers the data to latches, which hold the data on bit-lines down columns of the array. The invention is directed to an improved data loading circuit, which avoids high electrical current transients and associated noise.

However, the invention is not limited to use with DMDs, and could also apply to other types of SLMs that use similar loading methods. In the case of a DMD, each pixel of the image is generated with one or more mirror elements, whereas in the case of an SLM, a more general term would be "pixel-generating elements".

Figure 1:
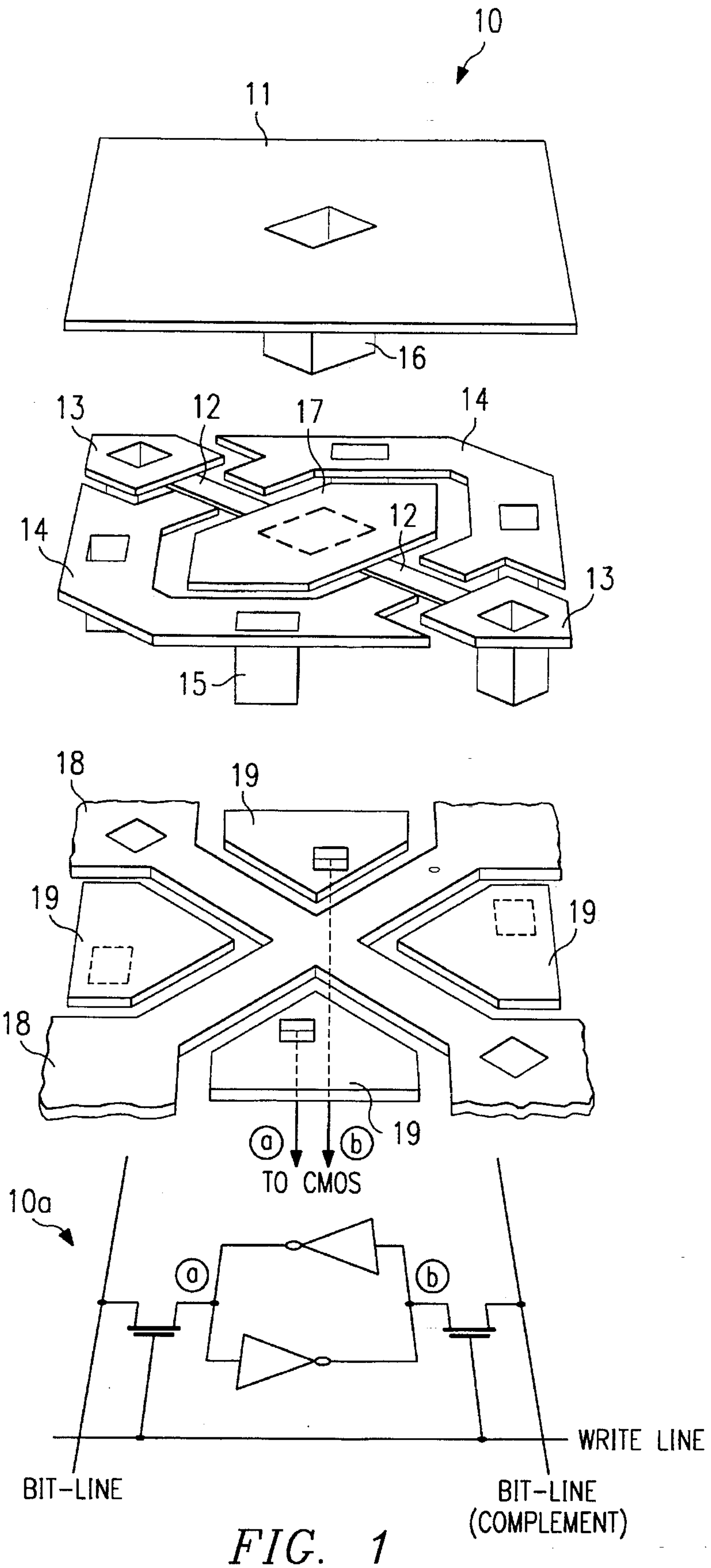
FIG. 1 is an exploded view of a hidden-hinge type mirror element used in a digital micro-mirror device (DMD, and having a memory cell controlled in accordance with the invention.

FIG. 1 is an exploded perspective view of a single mirror element 10 of a DMD. For purposes of example, mirror element 10 is a hidden-hinge type. As with other DMD designs, the hinges 12 are supported on support posts 13. Additionally, address electrodes 14 are supported by electrode posts 15 on the same level as hinges 12 and hinge support posts 13. A mirror 11 is fabricated above the hinge/electrode layer and is supported by a mirror support post 16.

Mirror support post 16 is fabricated over a landing yoke 17. Landing yoke 17 is attached to one end of each of the two hinges 12, which are torsion hinges. The other end of each hinge 12 is attached to a hinge support post 13. The hinge support posts 13 and electrode posts 15 support the hinges 12, address electrodes 14, and landing yoke 17 over a control bus 18 and address pads 19. When mirror 11 is tilted, the tip of the landing yoke 17 contacts the control bus 18. The control bus 18 and landing pads 19 have appropriate electrical via contacts to a substrate of address circuitry, which is typically fabricated within the substrate using CMOS fabrication techniques.

The address circuit of each mirror element 10 includes a memory cell 10*a*. In FIG. 1, the memory cell 10*a* is a static random access memory (SRAM) cell, manufactured with CMOS techniques. As explained below, each memory cell 10*a* is loaded with data passed down a pair of bit-lines that carry the output of a latch and its complement. Rows of memory cells 10*a* are enabled with a write signal. However, in other embodiments, memory cells 10*a* could be dynamic memory cells. U.S. patent Ser. No. (Atty Dkt No. TI-18361), entitled "Single Bit-Line Memory Cell for Spatial Light Modulator" incorporated by reference herein describes a memory cell that receives its data on a single bit-line, and that could be used in place of the memory cell 10*a* illustrated in FIG. 1.

In the example of this description, there is a one-to-one correspondence between memory cells 10*a* and mirror elements 10. However, in other embodiments, groups of mirror elements 10 might share a memory cell 10*a*. These shared memory cells are part of a "memory multiplexed" data loading method described in U.S. patent Ser. No. 08/300, 356, entitled "Pixel Control Circuitry for Spatial Light Modulator", assigned to Texas Instruments Incorporated and incorporated by reference herein. The invention is useful regardless of whether it is used to load multiplexed or non-multiplexed memory cells.

Another type of mirror element is the torsion beam type, whose hinges are not hidden but rather extend from opposing sides of the mirror. Still other types of DMDs are cantilever beam types and flexure beam types. Various DMD types are described in U.S. Pat. Nos. 4,662,746, entitled "Spatial Light Modulator and Method"; 4,956,610, entitled "Spatial Light Modulator"; 5,061,049 entitled "Spatial Light Modulator and Method"; 5,083,857 entitled "Multi-level Deformable Mirror Device"; and U.S. patent Ser. No. 08/171,303, entitled "Improved MultiLevel Digital Micromirror Device". Each of these patents is assigned to Texas Instruments Incorporated and each is incorporated herein by reference.

In operation for imaging applications, a light source illuminates the surface of the DMD. A lens system may be used to shape the light to approximately the size of the array of mirror elements 10 and to direct this light toward them. The mirror support post 16 permits mirror 11 to rotate under control of hinges 12. Mirror 11 rotates in response to an electrostatic force caused by application of an appropriate voltage to an address electrode 15.

Voltages based on data in the memory cells 10*a* of the underlying CMOS circuit are applied to the two address electrodes 14, which are located under opposing corners of mirror 11. Electrostatic forces between the mirrors 11 and their address electrodes 14 are produced by selective application of voltages to the address electrodes 14. The electrostatic force causes each mirror 11 to tilt either about +10 degrees (on) or about −10 degrees (off), thereby modulating the light incident on the surface of the DMD. Light reflected from the "on" mirrors 11 is directed to an image plane, via display optics. Light from the "off" mirrors 11 is reflected away from the image plane. The resulting pattern forms an image. Various modulation techniques can be used to form greyscale images, and color images can be created with filtered light.

In effect, the mirror 11 and its address electrodes 14 form capacitors. When appropriate voltages are applied to mirror 11 and its address electrodes 14, a resulting electrostatic force (attracting or repelling) causes the mirror 11 to tilt toward the attracting address electrode 14 or away from the repelling address electrode 14. The mirror 11 tilts until yoke 17 contacts bus 18.

Once the electrostatic force between the address electrodes 14 and the mirror 11 is removed, the energy stored in the hinge 12 provides a restoring force to return the mirror 11 to an undeflected position. Appropriate voltages may be applied to the mirror 11 or address electrodes 24 to aid in returning the mirror 11 to its undeflected position.

Figure 2:
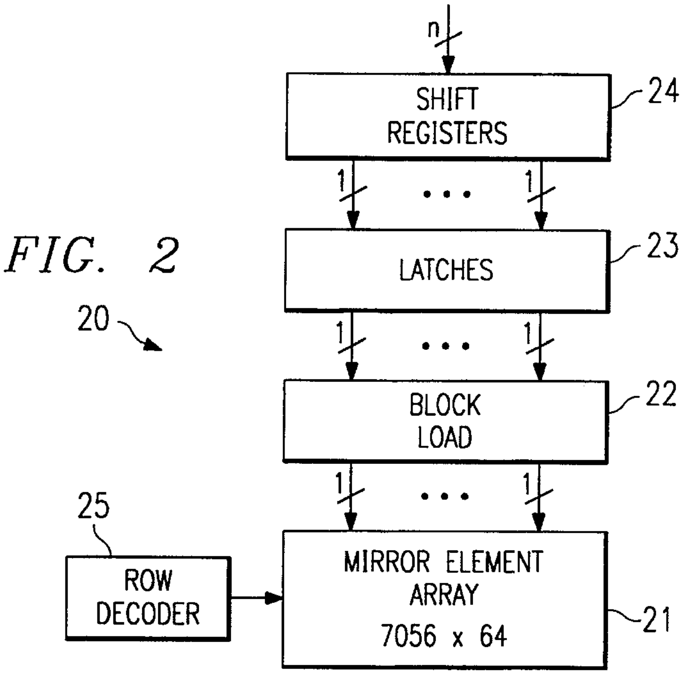
FIG. 2 illustrates the data loading circuitry for an array of mirror elements.

FIG. 2 illustrates a DMD device 20, comprising a mirror element array 21, a block load circuit 22, latches 23, a row of shift registers 24, and a row decoder 25. As explained below, a feature of the invention is that block load circuit 22 sequences the transfer of data from latches 23 to memory cells of array 21.

Mirror element array 21 is an array of mirror elements, such as the mirror elements 10 described above. In the example of this description, array 21 has 7056 mirror elements per row (7056 columns) and 64 rows of mirror elements. This is a typical array size for printing applications, where the array is used to expose 64 rows at a time as a drum revolves in the vertical direction with respect to the array. As stated above, in the example of this description, each mirror element 10 has its own memory cell 10*a*.

Data is loaded into mirror element array 21 in a special "bit-plane" format. Instead of being in pixel format, where data is ordered by pixel, then row, then frame, the data is ordered by bit, then row, then bit-plane, then frame. In other words, the primary order of the data is bit-by-bit, with all bits of one bit weight for all pixels being ordered together, then all bits of another bit weight, etc. For example, 8-bit pixel data would be ordered into 8 bit-planes, each bit-plane being comprised of the data for 1 of the 8 bit weights. This permits all mirror elements of device 20 to be simultaneously addressed with an electrical signal corresponding to a 1-bit value loaded to their associated memory cells. The length of time that any one mirror element remains "on" is controlled in accordance with the bit weight.

The formatting of data in this manner permits a type of pulse width modulation, which permits DMD device 20 to generate greyscale images. For printing applications, further details describing pulse width modulation and the formatting of the data for input to DMD device 20 are set out in U.S. Pat. No. 5,278,652, entitled "DMD Architecture and Timing for Use in a Pulse Width Modulated Display System", assigned to Texas Instruments Incorporated and incorporated by reference herein. For printing applications, further details are set out in U.S. patent Ser. No. 08/038,398, entitled "Process and Architecture for Digital Micromirror Printer", assigned to Texas Instruments Incorporated and incorporated by reference herein.

Although all mirror elements 10 of array 21 are simultaneously addressed, their memory cells 10*a* are loaded on a row-by-row basis. This is accomplished with shift registers 24 and latches 23. It is only after all memory cells 10*a* of array 21 are loaded that the mirror elements 10 are addressed with their address signals.

During one clock period, each shift register 24 receives 1 bit of data. Thus, for n-bit shift registers 24, the load cycle to fill all shift registers 24 requires n clock periods. For example, for a 7056 column array, 441 16-bit shift registers could each receive a value during each clock cycle, with 16 clock cycles for loading the row data.

After shift registers 24 receive one row of data, they pass this row data in parallel to latches 23, which hold the data on bit-lines to block load circuit 22. For memory cells 10*a* having a pair of bit-lines, latches 23 provide a data value and its complement to each bit-line.

Figure 3:
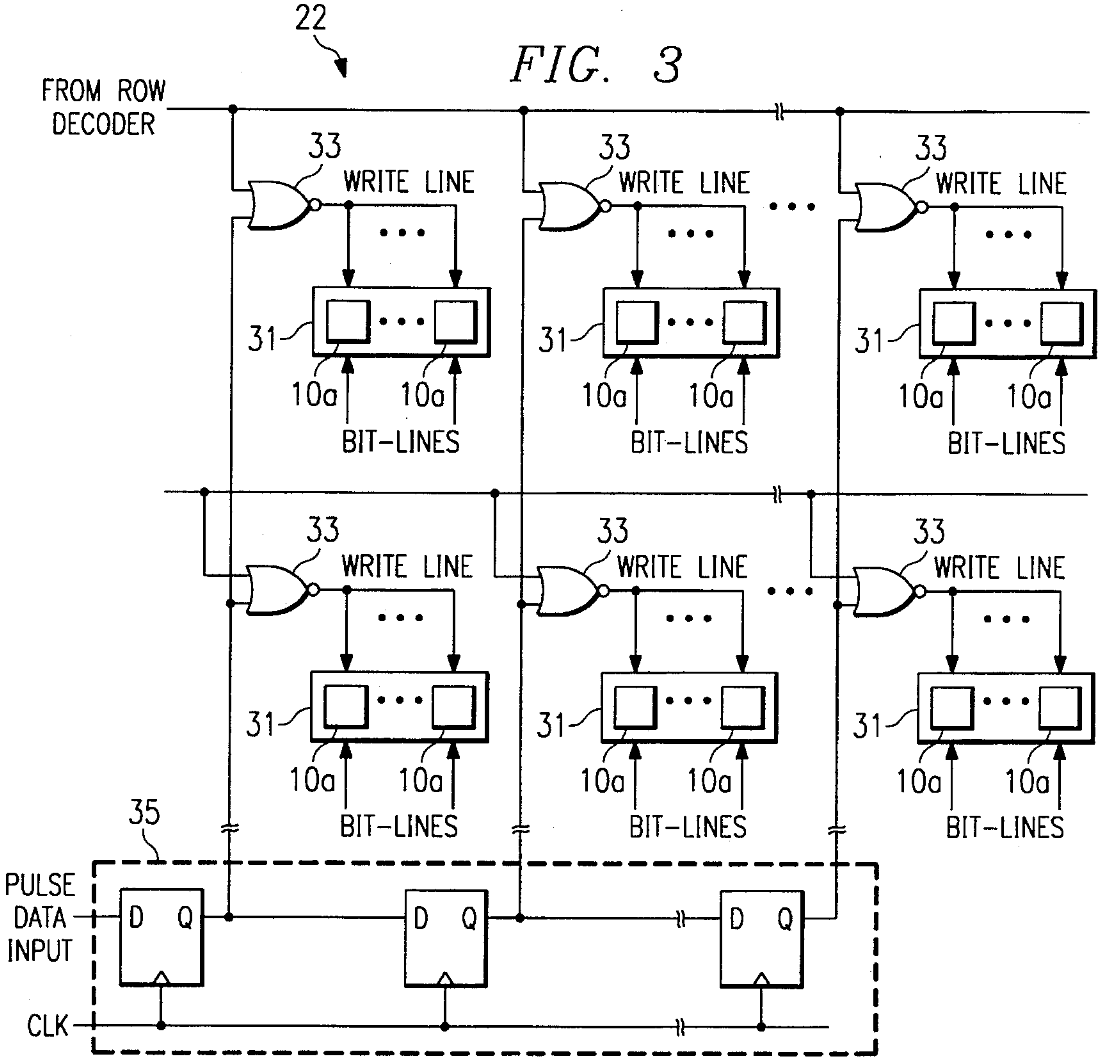
FIG. 3 illustrates a portion of the data loading circuitry of FIG. 2 in further detail.

FIG. 3 illustrates block load circuit 22 and memory cells 10*a* in further detail. As illustrated, the memory cells 10*a* have been logically divided into blocks 31. In this case, where there is a one-to-one correspondence of memory cells 10*a* and mirror elements 10 in array 21, each row of blocks 31 corresponds to a row of mirror elements 10. In multiplexed memory cell embodiments, a row of blocks 31 might correspond to multiple rows of mirror elements 10.

In the example of this description, each block 31 has 576 memory cells 10*a* for 576 mirror elements 10. For an array 21 having 7056 mirror elements per row, there would be 48 blocks per row.

The block load circuit 22 has a NOR gate 33 at the input to each block 31 of memory cells 10*a*. Each NOR gate controls when its block 31 will be loaded. A first input to NOR gates 33 is from row decoder 25 and is "low" when row decoder 25 has selected that row to be loaded. A second input to NOR gates 33 is a load signal from shift register 35, which delivers this signal sequentially down columns of blocks 31.

When it is time to load a row of data, the bit-lines are holding the data for that row. The load signal is written "low" into the first flip-flop of shift register 35. At each clock input to shift register 35, the load signal passes to the next flip-flop. In this manner, the load signal works across the shift register outputs. The result is a "low" load signal that shifts across each column of blocks 31. At any block 31, when both the row enable signal and the load signal are pulsed "low", the NOR gate output is high and that block 31 is loaded with its data via the bit-lines. Referring to FIG. 1, the outputs of NOR gates 33 are the word lines to each memory cell 10*a*.

It should be understood that the same function could be accomplished with other logic elements. For example, NOR gates 33 could be replaced with NAND gates and complements of the above-described input values would be used.

When a memory cell 10*a* is loaded, a typical transient switching current is 250 microamps. Without the block loading of the present invention, if all 7056 memory cells were loaded the same time, the peak current requirements of the device 20 would be approximately 1.8 amps. For typical devices, this can result in unacceptable thermal coefficients of expansion, power dissipation, reliability problems, "ground bounce", and memory stability problems. However, if the memory cells 10*a* are loaded in accordance with the invention, in blocks of 576 memory cells, the peak current is approximately 140 milliamps evenly distributed across the device 20.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A spatial light modulator (SLM), comprising:

an array of pixel-generating elements, each pixel-generating element being individually addressable with data, said array of pixel-generating elements having an associated array of memory cells for storing said data;

at least one bit-line associated with each column of memory cells for delivering data to said column of memory cells;

a row of shift registers for receiving row data for one row of said array from an external source for delivery to said memory cells;

a row of latches for receiving said row data from said shift registers, and for holding said row data on said bit-lines;

a block load circuit, interposed between said latches and said memory cells, for sequencing the delivery of said row data to a selected row of said memory cells by delivering a write signal to different blocks of said selected row of memory cells, with each block receiving said write signal at a different time; and a row decoder for delivering a row select signal to said block load circuit for determining which row of said memory cells is said selected row of memory cells.

2. The SLM of claim 1, wherein said spatial light modulator is a digital micro-mirror device, and wherein said pixel-generating elements are mirror elements.

3. The SLM of claim 1, wherein said pixel-generating elements have a one-to-one relationship with said memory cells.

4. The SLM of claim 1, wherein said pixel-generating elements are in groups, with each group in data communication with only one of said memory cells.

5. The SLM of claim 1, wherein said block load circuit has a shift register that sequentially delivers a block load signal to a logic gate at the input of each block.

6. The SLM of claim 1, wherein said block load circuit has a logic gate at the input of each block for receiving said row select signal and said block load signal.

7. The SLM of claim 1, wherein said block load circuit has a shift register that sequentially delivers a block load signal to a logic gate at the input of each block, said logic gate for outputting said write signal based on the states of said row select signal and said block load signal.

8. The SLM of claim 1, wherein said bit-lines comprise a bit-line and a complement bit-line to each said memory cell.

9. The SLM of claim 1, wherein said bit-lines comprise a single bit-line to each said memory cell.

10. A method of loading data to a spatial light modulator having individually addressable pixel-generating elements, comprising the steps of:

receiving a row of data into a row of shift registers;

delivering said row of data to a row of latches;

holding said row of data on bit-lines that run down columns of said pixel-generating elements;

selecting a row of pixel-generating elements to be addressed with said row of data by means of a row select signal;

sequentially loading memory cells of said row of pixel-generating elements in blocks of said memory cells; and repeating the above steps for different rows of data to be loaded to said spatial light modulator.

11. The method of claim 10, wherein said selecting step is performed with a row decoder.

12. The method of claim 10, wherein said loading step is performed with a logic gate at the input of each said block that receives said row select signal.

13. The method of claim 10, wherein said loading step is performed with a logic gate at the input of each said block that receives said row select signal and a load signal that shifts from block to block of the selected row of pixel-generating elements.

14. The method of claim 13, wherein said load signal is generated with a shift register.

15. The method of claim 13, wherein said load signal is generated with a D flip-flop shift register.

16. A digital micro-mirror device (DMD), comprising:

an array of mirror elements, each mirror element being individually addressable with data, said array of mirror elements having an associated array of memory cells for storing said data;

at least one bit-line associated with each column of memory cells for delivering data to said column of memory cells;

a row of shift registers for receiving row data for one row of said array from an external source for delivery to said memory cells;

a row of latches for receiving said row data from said shift registers, and for holding said row data on said bit-lines;

a block load circuit, interposed between said latches and said memory cells, for sequencing the delivery of said row data to a selected row of said memory cells by delivering a write signal to different blocks of said selected row of memory cells, with each block receiving said write signal at a different time; and a row decoder for delivering a row select signal to said block load circuit for determining which row of said memory cells is said selected row of memory cells.

* * * * *